United States Patent [19]

McConkey

[11] Patent Number: 5,074,536
[45] Date of Patent: Dec. 24, 1991

[54] FLANGE ALIGNMENT TOOL FOR LARGE PIPES

[76] Inventor: Dale R. McConkey, 2320 S. 8th St., Terre Haute, Ind. 47802

[21] Appl. No.: 638,451

[22] Filed: Jan. 4, 1991

[51] Int. Cl.$^5$ .............................................. B25B 1/20
[52] U.S. Cl. ...................................... 269/43; 269/48.1
[58] Field of Search ................ 269/43, 48.1; 279/2 R; 242/72, 72.1; 29/271, 272; 228/44.5

[56] References Cited

U.S. PATENT DOCUMENTS

| | | | |
|---|---|---|---|
| 2,696,359 | 12/1954 | Hill | 254/100 |
| 3,986,383 | 10/1976 | Petteys | 269/48.1 |
| 4,059,036 | 11/1977 | Hartley | 269/48.1 |
| 4,685,662 | 8/1987 | Vaughn | 269/43 |
| 4,767,125 | 8/1988 | Barry et al. | 269/48.1 |

Primary Examiner—Robert C. Watson
Attorney, Agent, or Firm—H. John Barnett

[57] ABSTRACT

A flange alignment tool for facilitating connection of large diameter, flanged pipe sections. The tool is inserted in the corresponding bolt openings of the adjacent flanges and expanded to cause the bolt openings to come into precise alignment all around the abutting flanges to be joined together. The tool comprises a plurality of internally tapered partial sleeve sections, each having a constant external diameter. The sleeve sections are resiliently biased against a pair of tapered expanding mandrels which are threadably received on a long, central bolt member which is turned to cause the mandrels to move together, expanding the alignment tool in the bolt openings. After the permanent fastening bolts are secured in the aligned bolt openings, the tool is contracted and removed from the bolt openings, and a permanent fastening bolt replaces it.

3 Claims, 1 Drawing Sheet

U.S. Patent   Dec. 24, 1991   5,074,536
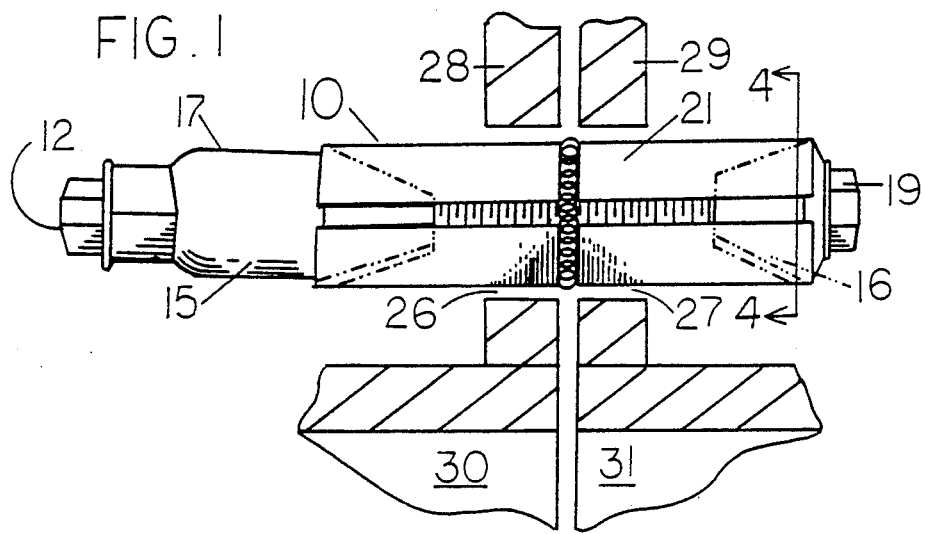
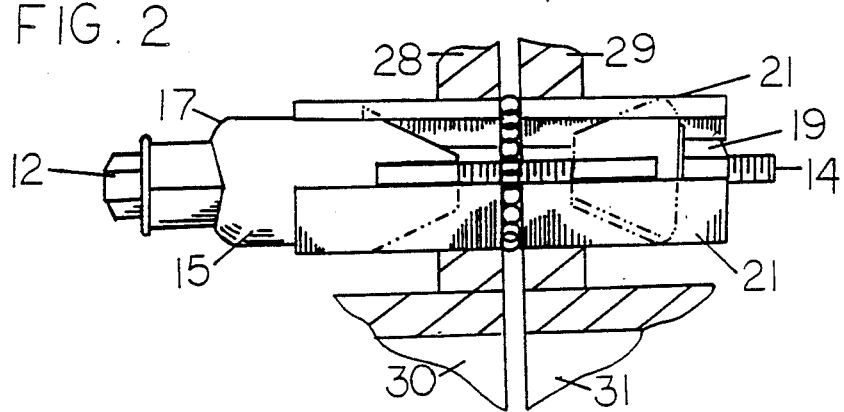
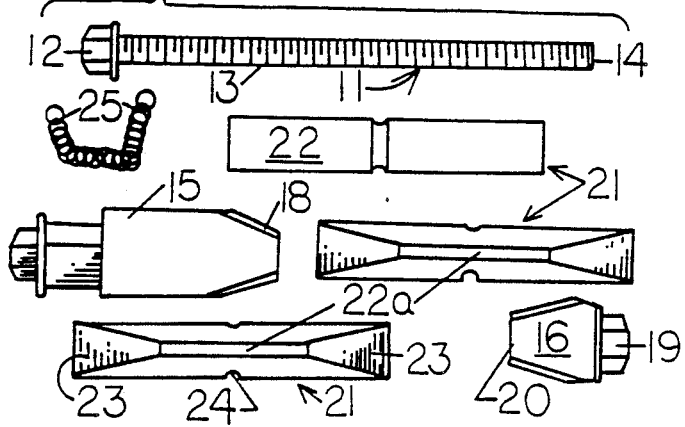
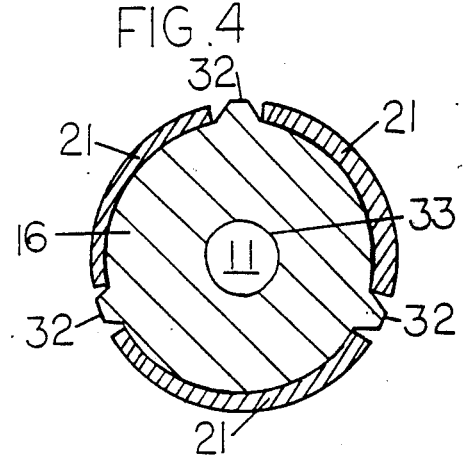

FLANGE ALIGNMENT TOOL FOR LARGE PIPES

BACKGROUND OF THE INVENTION

1. Field of the Invention

This invention relates to the assembly of large diameter, flanged pipe sections, and more particularly, to a flange alignment tool for facilitating alignment of the large, unwieldy pipe section flanges so that the bolt openings of the adjacent pipe section flanges come into precise alignment all around the abutting flanges to be bolted together.

2. Related Art

U.S. Pat. No. 3,878,597 shows a pneumatically powered tool for aligning holes in the flanges and angles of steel girders to be assembled to each other. The tool comprises jaw members held together by a split spring. The outer ends of the jaw members have pivotally attached tapered tips which are inserted through the bolt openings in adjacent girders. A wedge is hydraulically forced between the jaw members causing them to expand. This alignment tool does not provide uniform expansion in the adjacent bolt openings which is most important in aligning a pair of pipe flanges, both of which may move during the bolting procedure. It is important that the pipe flanges be precisely aligned to avoid leaking connections under pressure.

U.S. Pat. NO. 4,701,989 is directed to a pipe and flange alignment tool for properly assembling the flange on a pipe end so they can be welded together. This tool includes a plurality of spaced, radially extending pipe engaging means and flange engaging means disposed at opposite ends of the tool body. The pipe and flange engaging means are van-shaped members which extend through slits in the main body of the tool. This tool is apparently much larger in size than applicant's bolt alignment tool, and would be too complex to fit into the adjacent bolt openings of flanged pipe sections. If used as taught, it would require a long, manipulating handle for removal from the open end of adjacent pipe section after they are bolted together.

SUMMARY OF THE INVENTION

This invention is directed to a flange alignment tool for facilitating connection of large diameter, flanged pipe sections. The tool is inserted in the corresponding bolt openings of the adjacent flanges and expanded to cause the bolt openings to come into precise alignment all around the abutting flanges to be joined together.

The alignment tool comprises a plurality of internally tapered sleeve sections, each having a constant external diameter. The sleeve sections are resiliently biased against a pair of tapered expanding mandrels which are threadably received on a long, central bolt member having a tightening means on one end.

The assembled sleeve sections are resiliently held on the expanding mandrels by means of a circular spring which urges the sleeve sections against the expanding mandrels. When the tightening means is drawn down by the central bolt member after the tool is inserted in the bolt openings, the expanding mandrels move together, causing the sleeve sections to expand and fill the bolt openings, bringing them and all the bolt openings of the adjacent flanges into precise alignment, thereby allowing the easy insertion of the fastening bolts around the periphery of the flanged pipe connection. When the pipe sections are firmly secured together, the tool is contracted and removed from the aligned bolt openings and replaced with a permanent bolt attachment.

BRIEF DESCRIPTION OF THE DRAWINGS

FIG. 1 is an enlarged schematic side elevation with some parts in section, some parts broken away, and some parts shown in phantom showing the alignment tool inserted through the adjacent bolt openings of abutting flanged pipe sections;

FIG. 2 is similar to FIG. 1, but showing the alignment tool fully expanded to fill the adjacent bolt openings; and FIG. 3 is a side plan view of all the parts of the alignment tool disassembled; and FIG. 4 is a sectional view taken on line 4—4 of FIG. 1.

DETAILED DESCRIPTION

As shown in the drawings, an expandable alignment tool 10 comprises an elongated central bolt 11 having a head 12, a threaded shaft 13 and a threaded end 14. Assembled on the bolt 11 are tapered mandrels 15 and 16, having their narrowest portions facing each other.

Mandrel 15 has a tubular shoulder 17 outwardly from tubular, tapered end 18. Mandrel 16 has a threaded end nut 19 brazed on its outer end, and an inwardly tapered, tubular body section 20.

Three identical, internally tapered partial sleeve sections 21 fit over the central bolt 11 with the tubular mandrels 15 and 16 assembled thereon. The sleeve sections 21 each have an external cylindrical surface 22 of a generally constant external cylindrical arc. As best seen in FIG. 3, an internal passage 22a through each sleeve section 21 terminates in a flared section 23 at each end to receive the corresponding mandrel 15 or 16.

Each sleeve section 21 has a transverse groove 24 around its external cylindrical surface 23. A coil spring 25 is fitted into the groove 24, and holds the assembled alignment tool 11 together.

To use the aligning tool 11, it is first inserted in the adjacent bolt openings 26 and 27 of flanges 28 and 29 of corresponding pipe sections 30 and 31 which require precise alignment so that fastening bolts can be inserted in the other bolt openings 26 and 27.

After the tool 11 is in place, the head 12 of the central bolt 11 is tightened to draw the tapered mandrels 15 and 16 together. The mandrels 15 and 16 each have three peripherally spaced ridges 32 extending axially along their respective outer, tapered surfaces, as best seen in FIG. 4. The ridges 32 fit between the respective expanding sleeve sections 21 to provide aligning means to keep the sleeves 21 axially aligned as the end nut 19 is threaded down on central bolt 11 which extends axially through opening 33 in the mandrel 16. This action causes the tool 11 to expand in diameter, thereby completely filling the openings 26 and 27 as seen in FIG. 2, and precisely aligning all the respective pairs of adjacent openings 26 and 27 so that standard fastening bolt assemblies may be easily inserted in the aligned openings 26 and 27 to firmly secure the pipe sections 30 and 31 together.

To remove the tool 11, the central bolt 11 is loosened, allowing the mandrels 15 and 16 to retract, decreasing the diameter of the tool 11. Tool 11 is then removed and replaced by fastening bolt assembly (not shown).

The subject invention greatly simplifies the alignment and connection of large, flanged pipe sections. The careful alignment of the flanged pipe sections insures a strong seal between adjacent pipe sections which are so large and heavy that it is difficult to align them without applicant's tool.

I claim:

1. A tool for aligning corresponding bolt openings in the flanges of large, unwieldy pipe sections to be joined together comprising:

an elongated central bolt extending the length of said tool, said bolt including a head and a threaded shaft;

a first mandrel axially disposed on the end of said central bolt adjacent the head, said mandrel being tapered towards the middle of the threaded shaft;

a second mandrel also axially disposed on said bolt at the end opposite said first mandrel, said second mandrel being tapered towards said first mandrel;

a threaded end nut brazed to the outer end of said second mandrel disposed on the outer end of said threaded shaft;

a plurality of split sleeve sections having arcuate outer surfaces assembled co-axially over said first and second mandrels, each sleeve section having a taper on its inner surface at each of the outer ends thereof complementary to the corresponding taper of the respective first and second mandrels;

resilient retaining means holding said sleeve sections against said mandrels in a unitary assembly having a substantially constant outer diameter; and a plurality of peripherally spaced, axially extending ridges on the outer, tapered surfaces of the first and second mandrels to provide an axial guide means for said split sleeve sections as the tool is expanded in the corresponding bolt openings of the adjacent flanges of two pipe sections of two large pipe sections into which it has been inserted for aligning said pipe sections by urging the end nut on the outer end of the elongated central bolt towards the head thereof, thereby causing the first and second mandrels to expand the split sleeve sections to completely fill the corresponding bolt openings of said adjacent flanges of said pipe sections.

2. The tool of claim 1, in which there are three split sleeve sections, and each tapered mandrel has three axially extending ridges providing axial guide means for the sleeve sections.

3. The tool of claim 2, in which the resilient retaining means is a circular coil spring, and including transverse, peripherally aligned grooves on the outer surfaces of the sleeve sections to receive the circular coil spring, and urge the sleeve sections against the tapered mandrels and hold the tool together in a unitary, expandable and contractible structure.

* * * * *